(12) United States Patent
Song et al.

(10) Patent No.: US 12,182,224 B2
(45) Date of Patent: Dec. 31, 2024

(54) ONLINE FAST PROCESSING METHOD FOR REAL-TIME DATA BASED ON EDGE COMPUTING

(71) Applicant: DALIAN UNIVERSITY OF TECHNOLOGY, Liaoning (CN)

(72) Inventors: Xueguan Song, Liaoning (CN); Liangliang Yang, Liaoning (CN); Xiaonan Lai, Liaoning (CN); Xiwang He, Liaoning (CN); Kunpeng Li, Liaoning (CN); Yong Pang, Liaoning (CN); Wei Sun, Liaoning (CN); Peng Li, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 306 days.

(21) Appl. No.: 17/799,165

(22) PCT Filed: May 5, 2022

(86) PCT No.: PCT/CN2022/090891
§ 371 (c)(1),
(2) Date: Aug. 11, 2022

(87) PCT Pub. No.: WO2023/045338
PCT Pub. Date: Mar. 30, 2023

(65) Prior Publication Data
US 2023/0229725 A1  Jul. 20, 2023

(30) Foreign Application Priority Data

Sep. 27, 2021 (CN) .......................... 202111135158.6

(51) Int. Cl.
*G06F 17/10* (2006.01)
(52) U.S. Cl.
CPC .................................. *G06F 17/10* (2013.01)

(58) Field of Classification Search
CPC ....................................................... G06F 17/10
(Continued)

(56) References Cited

U.S. PATENT DOCUMENTS

| 2013/0226493 | A1* | 8/2013 | Martinez | G01V 1/364 |
| | | | | 702/96 |
| 2019/0187297 | A1* | 6/2019 | Li | G01S 19/49 |

(Continued)

FOREIGN PATENT DOCUMENTS

| CN | 101806593 A | 8/2010 | |
| CN | 103674025 A * | 3/2014 | G01C 21/16 |

(Continued)

OTHER PUBLICATIONS

Christodoulakis et al. "On the filtering and smoothing of biomechanical data," OTSP-9, CSNDSP, pp. 512-516. (Year: 2010).*

(Continued)

*Primary Examiner* — Ricky Go
(74) *Attorney, Agent, or Firm* — MUNCY, GEISSLER, OLDS & LOWE, P.C.

(57) ABSTRACT

An online fast processing method for real-time data based on edge computing. In the method, a dynamic online de-noising method is adopted to remove noise contained in speeds to ensure the effectiveness and accuracy of de-noising results; for the displacement integrated online, an efficient method is adopted for dynamic online de-noising to further reduce the effectiveness of drift in the displacement value on final integration results; and under the condition of ensuring the accuracy of an integration method, an integration algorithm is embedded into an edge device to realize fast calculation and analysis of data near a data source and realize dynamic fast integration of online signals based on the edge device, which provides effective references for efficient processing and calculation of data.

1 Claim, 3 Drawing Sheets

(58) Field of Classification Search
USPC .......................................................... 702/141
See application file for complete search history.

(56) References Cited

U.S. PATENT DOCUMENTS

2021/0319894 A1* 10/2021 Sobol ..................... G16H 20/30
2022/0221486 A1* 7/2022 Lorenzo ................. G01P 13/00

FOREIGN PATENT DOCUMENTS

| | | |
|---|---|---|
| CN | 110597144 A | 12/2019 |
| CN | 113009566 A | 6/2021 |
| CN | 113901379 A | 1/2022 |
| EP | 2063275 A2 | 5/2009 |
| JP | 2006194822 A | 7/2006 |

OTHER PUBLICATIONS

Liu et al. "Signal Processing and Accelerometer-based Design for Portable Small Displacement Measurement Device," The 2008 International Conference on Embedded Software and Systems (ICESS2008), pp. 575-579. (Year: 2008).*

* cited by examiner

ONLINE FAST PROCESSING METHOD FOR REAL-TIME DATA BASED ON EDGE COMPUTING

TECHNICAL FIELD

The present invention belongs to the technical field of signal processing and relates to an online fast processing method for real-time data based on edge computing.

BACKGROUND

Monitoring signals can objectively reflect the actual operation status of equipment to a certain extent, so real-time online processing of the monitoring signals can effectively improve the timeliness of monitoring data and realize rapid analysis and dynamic feedback of monitoring information. In practical operations, the displacement information of a cantilever beam-liked structure can reflect the posture, the position and the like of monitoring parts under load or stress more clearly, so the effective acquisition of the displacement information is conducive to a more accurate representation of the actual posture of monitoring equipment and effective guidance of the implementation of predictive maintenance for the equipment. However, since the vibration of the equipment leads to certain elastic deformation of the cantilever beam-liked structure, it is difficult to ensure the consistency of monitoring displacement in the actual running process by laser displacement sensing equipment which has higher requirements for the installation position and installation space, resulting in certain limitation to the applicability of the sensing equipment. Compared with other sensors (such as temperature, displacement and pressure sensors), the acceleration sensor has the characteristics of strong adaptability, good economy and convenient data acquisition and thus is widely used in different equipment monitoring.

At present, processing methods for acceleration data mainly aim at complete acceleration information, and rarely consider dynamic online processing of online acceleration data. These methods can realize effective de-noising and processing of acceleration data, but they require higher integrity of data. Therefore, it is difficult to realize real-time dynamic fast processing of online acceleration data by using the existing methods.

SUMMARY

To solve the above problems, the present invention proposes a real-time dynamic signal fast processing method for online signals based on edge computing. The proposed online fast processing algorithm is embedded into an edge device by arranging the edge device near a data source and based on the sampling frequency of an acceleration sensor, and under the condition of meeting online fast processing operations, the timeliness of data analysis is further improved near the data source to avoid delay caused by bandwidth, reduce the storage space and increase the information density. The method of the present invention can realize dynamic fast processing of online monitoring data on the edge device.

The sampling frequency of the used acceleration sensor is determined, and whether the number of accelerations currently acquired meets the integration requirements (current data≥2) is judged. If yes, the speed value generated between the current acceleration and the previous monitoring acceleration is calculated to obtain speeds corresponding to current monitoring time points. Whether the number of the current monitoring points reaches ¼ of the sampling frequency value is judged, if no, due to the short monitoring time and considering the stability and reliability of signals, it is considered that noise in the signals is less and has less influence on integration results, so the integrated speed data will not be de-drifted or de-noised. Displacement generated by adjacent speeds are calculated directly to obtain the corresponding values. If the data of the monitoring points reaches ¼ of the sampling frequency, the obtained speeds are dynamically de-noised. The de-noised speed values are integrated, i.e., the displacement value generated between two adjacent speed points is calculated, and finally, the displacement obtained by integration is de-noised in real time to further reduce the influence of drift in the integrated displacement.

The technical difficulties of the present invention mainly include the following parts:

1) For the online integrating speed, a dynamic online de-noising method is adopted to remove noise contained in the speed to ensure the effectiveness and accuracy of de-noising results;

2) For the displacement integrated online, an efficient data de-noising method is adopted for dynamic online de-noising to further reduce the effectiveness of drift in the displacement value on the final integration results;

3) Under the condition of ensuring the accuracy of an integration method, an integration algorithm is embedded into an edge device to realize fast calculation and analysis of data near a data source.

The technical solution of the present invention is as follows:

An online fast processing method for real-time data based on edge computing, comprising the following specific steps:

Step (1): Designing a Dynamic Integration Algorithm

Assuming that the acquired original acceleration data is $a=(a_1^i, a_2^i, \ldots, a_n^i)^T$, wherein i represents the $i^{th}$ monitoring time point, and n represents the number of monitoring points. Assuming that the interval between two monitoring time points is $\Delta t$, the sampling frequency of the corresponding sensor is $1/\Delta t$, and the speed calculation of the corresponding monitoring point is expressed as follows:

$$v_j^i = (a_j^{i-1} + a_j^i) \times \Delta t / 2 \quad (1)$$

wherein $a_j^{i-1}$ represents the acceleration corresponding to the $j^{th}$ monitoring point at the $(i-1)^{th}$ time point, and $a_j^i$ represents the acceleration value corresponding to the $j^{th}$ monitoring point at the $i^{th}$ time point, wherein $j \in [1, n]$, and $v_j^i$ represents the integrated speed corresponding to the $j^{th}$ monitoring point at the $i^{th}$ time point.

After integration, judging whether the number of accelerations currently collected at the same monitoring point reaches ¼ of the sampling frequency (i.e., whether the number of acceleration sample points collected at the same monitoring point is more than ¼ of the number of sampling frequencies). If the number of accelerations currently collected is less than ¼ of the sampling frequency value, it is considered that the speed obtained by the current integration is less affected by noise and drift (the influence of noise data in the acceleration increases gradually with the increase of integration time in the integration process, and such noise is shown as drift in the integrated speed. That is, with the increase of time, the drift value in the speed has great influence on the speed. Therefore, to ensure the effectiveness and accuracy of the integration result, it is verified that when the number of sampling points is less than ¼ of the sampling frequency value, it can be considered that the drift has little influence on the integrating speed), and the integrated speed is regarded as an ideal speed and is not de-noised. Then, directly integrating the speed obtained by the current integration again to acquire the corresponding displacement, and the displacement currently obtained is the final ideal displacement value.

If the number of collected accelerations is more than ¼ of the sampling frequency value, it is considered that the speed currently integrated is greatly affected by the drift. Dynamically de-noising the integrated speed to reduce the influence of the drift on the integrating speed. The whole de-noising process is expressed as follows:

$$Z_j^i = \alpha \cdot Z_j^{i-1} + (1-\alpha) \cdot v_j^i \quad (2)$$

wherein $Z_j^i$ represents the trend value contained in the current integrating speed, i represent the $i^{th}$ moment, and j represents the corresponding $j^{th}$ monitoring point; $Z_j^{i-1}$ represents the drift trend value corresponding to the previous time point, and when i=2, the value of $Z_j^{i-1}$ is only the integrating speed of the previous time point, i.e., the initial point; $v_j^i$ represents the integrating speed of the $j^{th}$ monitoring point at the $i^{th}$ time point; and $\alpha$ is the weight value corresponding to $Z_j^{i-1}$. If the sampling frequency of an acceleration sensor is f the sampling interval between two adjacent time points is 1/f, and the corresponding weight value is expressed as follows:

$$\alpha = \frac{1/4}{1/4 + 1/f} \quad (3)$$

It can be known from expression (2) that the drift trend value at the current monitoring point not only depends on the trend value corresponding to the previous time point, but also depends on the speed value obtained by integration at the current time point. It can be known from expression (3) that the value of $\alpha$ is close to 1, that is, the drifting trend corresponding to the current time point is greatly affected by the drifting trend of the previous time point, and the current integrating speed value only gives the drifting trend of the previous time point a step size. The de-noised speed corresponding to the current time point is expressed as follows:

$$\hat{v}_j^i = v_j^i - Z_j^i \quad (4)$$
$$= v_j^i - \alpha \cdot Z_j^{i-1} - (1-\alpha) \cdot v_j^i$$
$$= \alpha \cdot (v_j^i - Z_j^{i-1})$$

wherein $\hat{v}_j^i$ represents a de-noised ideal speed.

To obtain the corresponding displacement, it is necessary to integrate the de-noised ideal speed (as shown in expression (4)) again, and the integration process is as follows:

$$s_j^i = (\hat{v}_j^{i-1} + \hat{v}_j^i) \times \Delta t/2 \quad (5)$$

wherein $s_j^i$ represents the displacement corresponding to the $i^{th}$ monitoring time point, and j represents the reference sign of the monitoring point.

Considering that the de-noised ideal speed still contains some noise information, the noise information is shown in the form of drift in the displacement obtained after integration. Therefore, to ensure the accuracy of the displacement information finally acquired, it is necessary to de-noise the displacement information again. Traditional high-pass filter mainly processes the acquired complete information, in which the cut-off frequency depends on the complete signal characteristics. This method can achieve ideal de-noising effects, but is difficult to be applied to dynamic de-noising of online data because of strict requirements for data integrity. In view of this, the present invention proposes a dynamic online high-pass filter method, which adopts a dynamic filter method to filter data online aboutreal-time integration results. A Butterworth filter is adopted, the principle of which can be expressed as follows:

$$|H(w)|^2 = 1 - \frac{1}{1 + \left(\frac{w}{w_c}\right)^{2m}} = 1 - \frac{1}{1 + \varepsilon^2 \left(\frac{w}{w_p}\right)^{2m}} \quad (6)$$

wherein $w_c$ represents the cut-off frequency corresponding to the filter, m represents the order of the corresponding filter, and $w_p$ represents the pass-band edge frequency. When the corresponding frequency (the sampling period T represents the number of sensor sampling points within one second, i.e., each sampling point corresponds to a certain number of periods, so the frequency corresponding to the current point can be obtained, and the frequency corresponding to $s_j^i$ is compared with the cut-off frequency $w_c$) is more than the cut-off frequency ($w > w_c$), the corresponding $$\left(\frac{w}{w_c}\right)^{2m}$$

value is close to infinity, and the $|H(w)|^2$ value is closer to 1, which indicates that all the signals pass. When the corresponding signal frequency is lower than the cut-off frequency ($w \leq w_c$), the corresponding $$\left(\frac{w}{w_c}\right)^{2m}$$

value is close to 0, and $|H(w)|^2$ is close to 0. At this moment, the corresponding signal will be cut off, which is 0. The process can be expressed as follows:

$$|H(w)|^2 = \begin{cases} 0 & w \leq w_c \\ 1 & w > w_c \end{cases} \quad (7)$$

The larger the filter order of n is, the smoother the filtered value is, and the closer the filter is to an ideal filter. The filter order adopted here is set to 8 (the corresponding maximum filter order), the cut-off frequency is set to 0.012×w (it is verified that when the cut-off frequency is set to this value, the accuracy of the filtering result is the highest), and high-pass filter is adopted to de-noise the integrated displacement, that is, when the frequency is higher than the set cut-off frequency, the displacement obtained by integration can be regarded as the final ideal value, and when the frequency corresponding to the displacement point is lower than the cutoff frequency, the value corresponding to this part is flattened. The de-noised integral displacement can be expressed as follows:

$$\hat{s}_j^i = s_j^i - N_j^i \quad (8)$$

wherein $s_j^i$ represents the result obtained by the corresponding direct integration in formula (5), $N_j^i$ represents the noise value obtained by high-pass filter, and $\hat{s}_j^i$ represents the corresponding ideal integral displacement value after de-noising.

Step (2): embedding the dynamic integration algorithm designed in step (1) into an edge device so as to realize dynamic fast processing of online signals based on edge computing.

All the specific processes of proposed dynamic integration are described in the above steps. To further improve the timeliness of dynamic integration, here the proposed dynamic integration algorithm is embedded into the edge device to perform rapid integral calculation near the data source, avoiding the influence of network transmission bandwidth on the timeliness of integration, reducing the proportion of redundant data (collected acceleration data) in the cloud and improving the share of data storage. The whole flow can be expressed as shown in FIG. 2(a). FIG. 2(b) shows the traditional cloud-based computing method. It can be known by comparison that the proposed cloud computing method does not pass through complex data transfer protocols, so delay caused by bandwidth and transfer protocols can be avoided.

The present invention has the following beneficial effects:

As the existing methods are difficult to realize dynamic online integral operation, the present invention proposes a dynamic online integration method. Compared with the methods in existing data, the method has obvious advantages and can realize dynamic online processing of real-time monitoring data, and the integration results have higher accuracy and better robustness.

DETAILED DESCRIPTION

Figure 1:
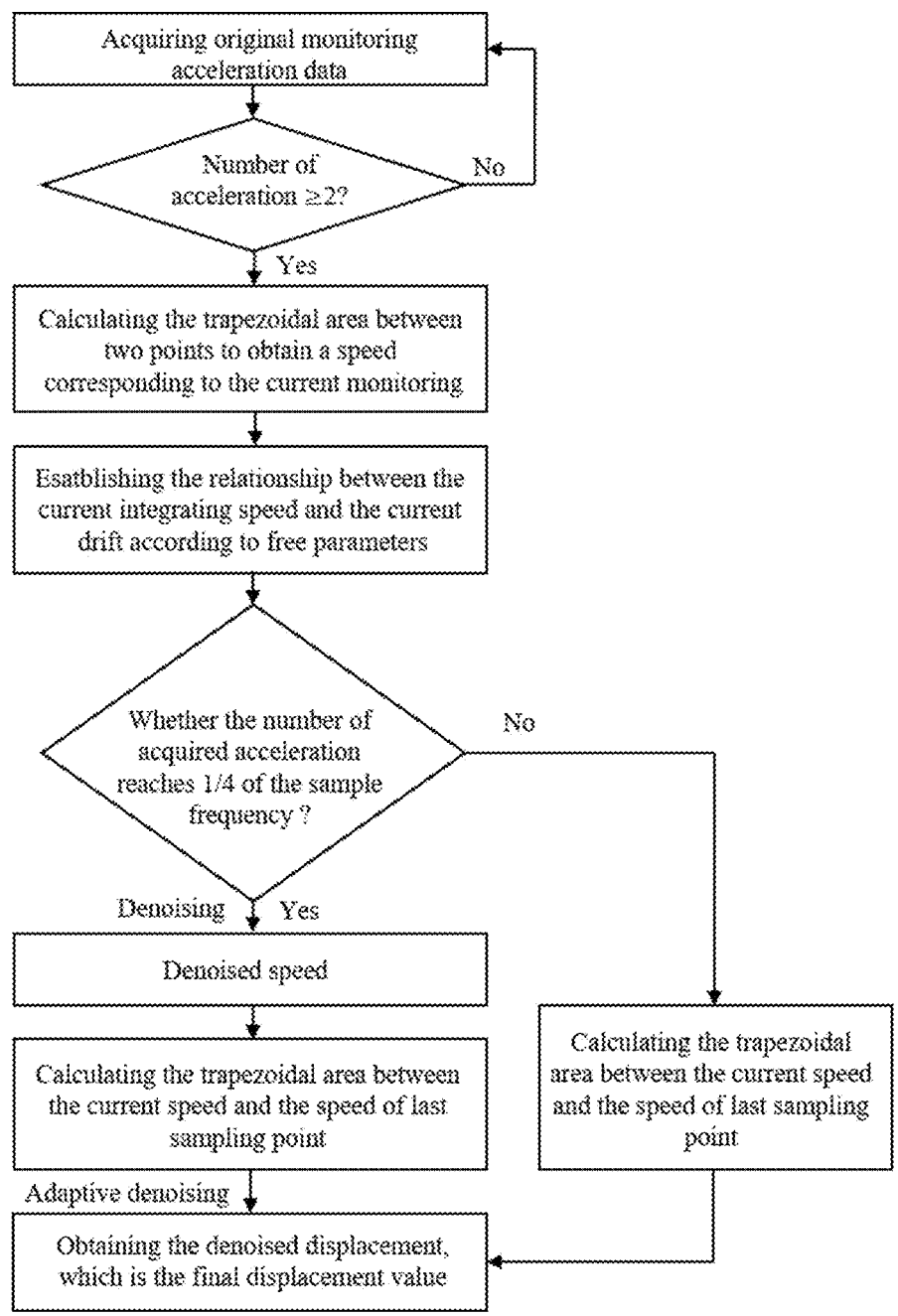
FIG. 1 is a flow chart of the present invention.

The present invention is further described below in combination with specific embodiments.

Corresponding test functions are constructed to verify the effectiveness of the proposed method, and the constructed test functions are as follows:

$$\begin{cases} s(t) = -2\sin(4\pi t) \\ v(t) = -8\pi\cos(4\pi t) \\ a(t) = 32\pi^2\sin(4\pi t) + n \end{cases} \quad (9)$$

The constructed test functions are shown above, wherein s(t), v(t) and a(t) represent displacement, speed and acceleration respectively, and n represents added noise. In order to make the constructed test functions closer to values measured in the real environment, the present embodiment respectively adopts values with signal-to-noise ratios (SNR) of 5, 10, 15 and 20 for verification, and the target displacement value is s(t), which is used as a target value for verifying the effectiveness of the method. The specific implementation steps are as follows:

1) First, determining the sampling frequency of a sensor, so as to determine a weight value α corresponding to the previous time point, as shown in formula (3); here the sampling frequency is set to 100 Hz, that is, 100 acceleration sample points are collected within 1 s, so the change step of time t is set to 0.01, that is, 100 sample points can be collected within 1 s, and in this way, the corresponding weight value is $$\alpha = \frac{1/4}{1/4 + 1/100} = 0.9615.$$

2) Integrating acceleration data, as shown in formula (1); when the variation range of t is 0-20, the number of the corresponding collected points is 2000, and 5 sampling points with numbers of 600-604 are selected for case analysis, wherein the value of SNR is set to 20, the corresponding acceleration data is [−1.4575754983679766e-13, 5.58146865524312, 13.513797023872176, 13.211154730847605, 21.60266538485112], and according to formula (1), that is, the corresponding values of $a_{600}$, $a_{601}$, $a_{602}$, $a_{603}$ and $a_{604}$ are shown above and the corresponding time is Δt=0.01, speeds corresponding to $v_{600}$, $v_{601}$, $v_{602}$, $v_{603}$ and $v_{604}$ are [−3.9534573072086268, −3.9254971656484674, −3.8499622325798386, −3.723061399174048, −3.5444222722567176].

3) Judging whether the number of accelerations currently collected is more than ¼ of the number of sampling frequencies, if the number of the collected accelerations is less than ¼ of the number of sampling frequencies, it can be considered that the current integrating speed is less affected by drift, then directly going to step 6); otherwise, doing the next step;

4) As shown in formula (2), calculating the drift value contained in the integrated speed according to formula (2);

5) Subtracting the drift calculated according to formula (2) from the current speed integration results to obtain a de-drifted speed value, as shown in formula (4); calculating the corresponding trend values $Z_{600}$, $Z_{601}$, $Z_{602}$, $Z_{603}$ and $Z_{604}$ as respectively [−1.9014722432840203, −2.028966441121721, −2.1481829308984572, −2.2576934812704277, −2.3560161996893796], and the de-noised speeds are [−3.177929670806483, −3.031373900547152, −2.833138321092142, −2.576138367056468, −2.2770464786599627].

6) Integrating the integrated speed again to obtain a corresponding displacement value, as shown in formula (5). Judging whether the number of acceleration monitoring points currently acquired is more than ¼ of the number of sampling frequencies, if the number of the collected acceleration monitoring points is less than ¼ of the number of sampling frequencies, it is considered that the current integral displacement is less affected by the drift, and the current integral displacement can be directly regarded as the final displacement value. Otherwise, entering step 7); further integrating the de-noised speed data obtained in step 5) to obtain corresponding displacement values $S_{600}$, $S_{601}$, $S_{602}$, $S_{603}$ and $S_{604}$ which are specifically [1.3095679261476776, 1.2801369860087743, 1.2523778296973533, 1.2267627167978188, 1.2036824421874557].

7) Dynamically de-noising the integrated displacement online, as shown in formulas (6) and (7);

8) Subtracting noise effect in the displacement from the current integral displacement to obtain the final ideal displacement, as shown in formula (8); and the corresponding displacement after final high-pass filter are [9.8321e-11, −0.0734, −0.1203, −0.1837, −0.1868], wherein the corresponding true values are [8.3975e-16, −0.0358, −0.0708, −0.1047, −0.1368].

Figure 2:
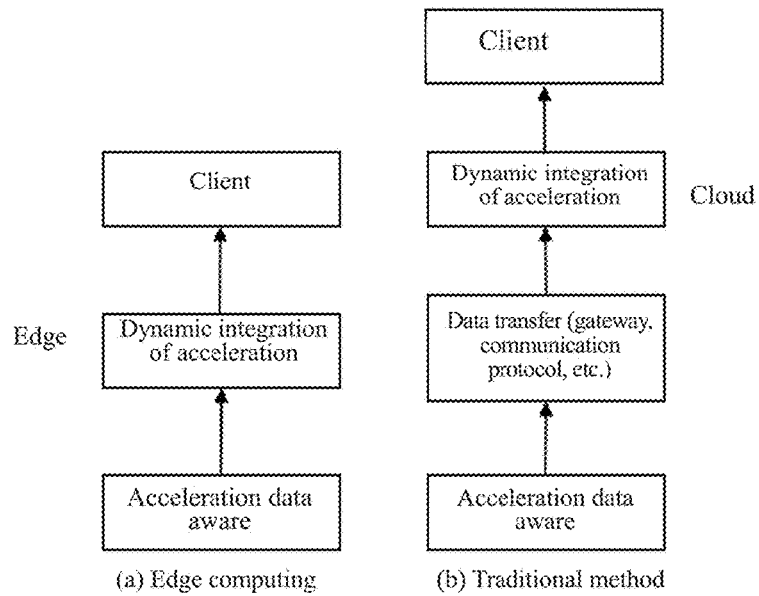
FIG. 2 is a schematic diagram of comparison of edge computing and a traditional cloud computing method.

9) Embedding the proposed algorithm into an edge device to perform fast calculation near a data source, as shown in FIG. 2(a).

Figure 3:
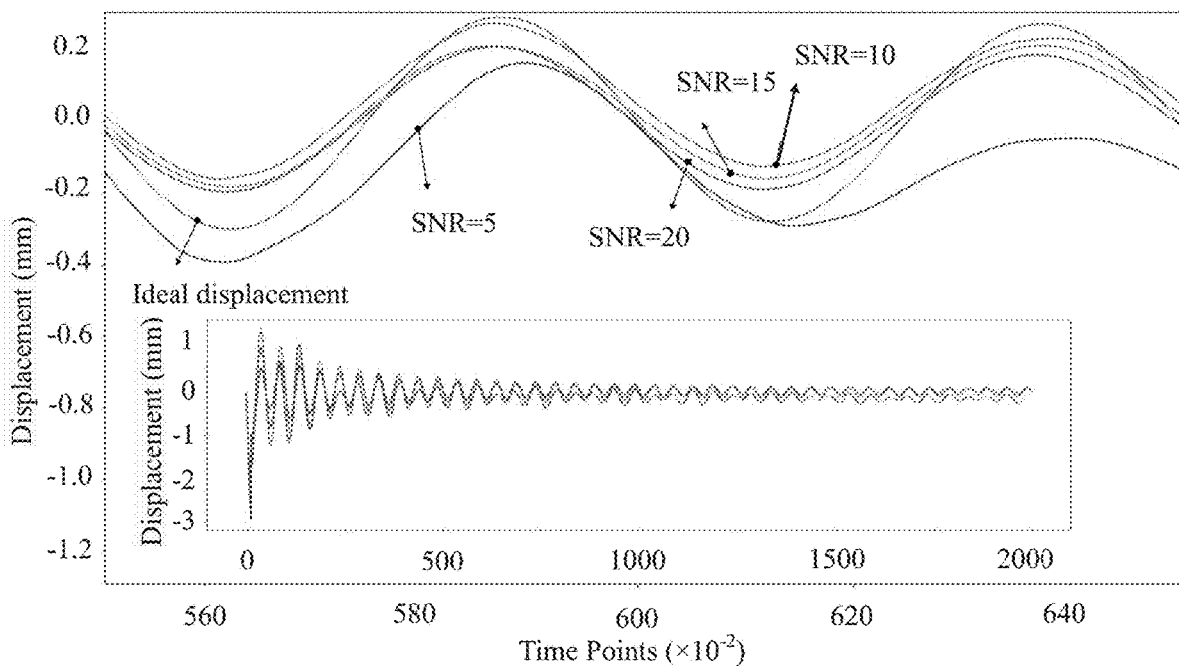
FIG. 3 is a schematic diagram of double integral of high-pass filter.

A true acceleration is simulated by adding Gaussian noise to the constructed acceleration, and the noise level (SNR, signal-to-noise ratio) is controlled to verify the effectiveness of the proposed method. Now the traditional methods and the method of the present invention are analyzed and compared, and the integration results of the solutions are compared as follows:

FIG. 3 shows the corresponding results obtained by means of double integral and high-pass filter, and the process can be described as follows: acceleration data containing noise is dynamically integrated, the corresponding speed values are obtained by online integral calculation, the integrated speed values are dynamically calculated respectively, the speed values dynamically integrated online are subjected to high-pass filter to reduce the drift value in the integrated speeds, and the speed subjected to high-pass filter is regarded as the ideal speed. Then the ideal speed is integrated again to obtain the corresponding displacement value. Since the drift in the speed is not eliminated completely, the integrated displacement is subjected to high-pass filter again to further reduce the influence of the drift on the integration results. The final integration results are shown in FIG. 3. The local enlarged view of integral displacement is located in the upper part, and the global reduced view is located in the lower part.

Figure 4:
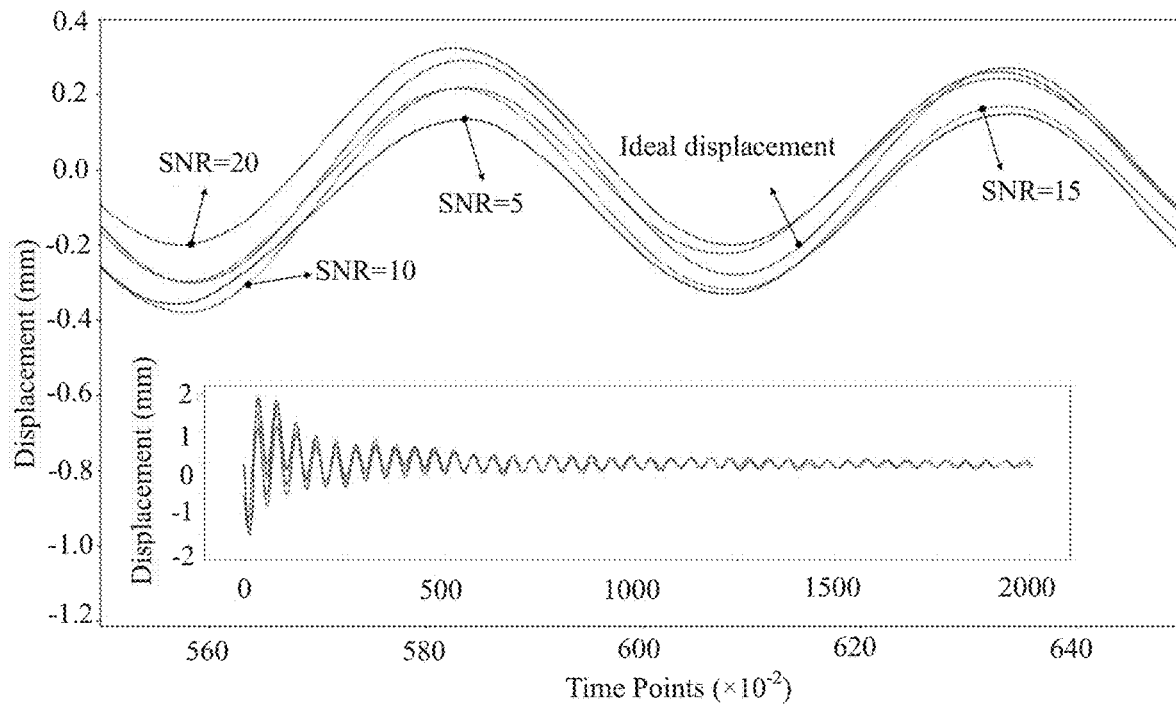
FIG. 4 is a schematic diagram of exponentially weighted average double integral.

FIG. 4 shows the corresponding results obtained by means of double integral and exponential weighted average, and the process can be described as follows: acceleration data containing noise is dynamically integrated, the obtained speed value is integrated online, the speed value is exponentially weighted to obtain the corresponding de-noised ideal speed, and the ideal speed is further integrated to obtain the corresponding displacement value. The integral displacement value is further de-noised again by means of exponential weighted average to obtain the corresponding de-noised ideal displacement result, as shown in FIG. 4.

Figure 5:
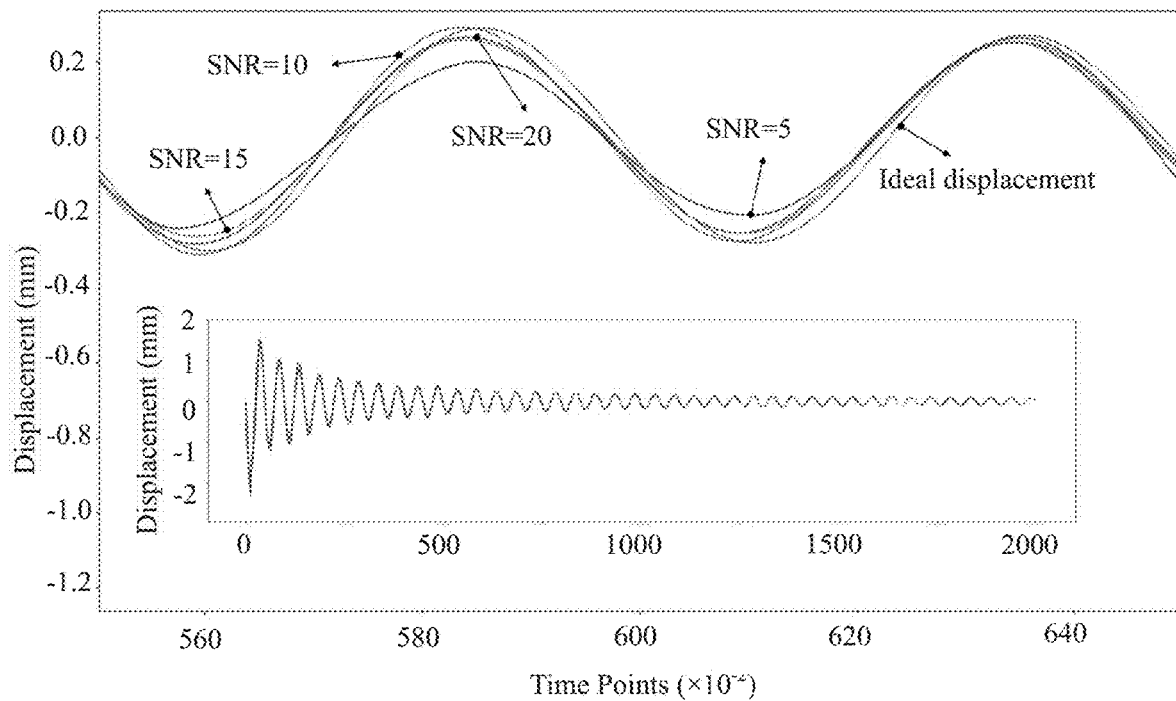
FIG. 5 is a schematic diagram of integration results of a method of the present invention.

FIG. 5 is a schematic diagram of integration results of a method proposed by the present invention. It can be known by comparison and analysis that when the signal-to-noise ratio (SNR) is increased, i.e., noise in the original acceleration is reduced, the trend change of the integral displacement is closer to ideal displacement, as shown in the figure. Compared with the results shown in FIG. 3 and FIG. 4, when the SNR changes from 5 to 20, the fluctuation range of the integral displacement of the proposed method is small, that is, the integration accuracy is less affected by noise, which proves that the method has good robustness. Moreover, it can be known by comparing the integration results in FIG. 3, FIG. 4 and FIG. 5 that when the SNR is equal to different values, the integral values of the method proposed by the present invention are closer to the ideal displacement. Therefore, the method of the present invention has accurate integration effects.

The invention claimed is:

1. An online fast processing method for real-time data based on edge computing, comprising the following specific steps:

installing an acceleration sensor on a cantilever beam-liked structure, the acceleration sensor to collect and monitor acceleration data on the cantilever beam-liked structure;

acquiring the acceleration data of the cantilever beam-liked structure by the acceleration sensor to calculate an integrated speed based on an edge device, wherein an acquired original acceleration data of the cantilever beam-liked structure is $a=(a_1^i, a_2^i, \ldots, a_n^i)^T$, wherein i represents the $i^{th}$ monitoring time point, and n represents the number of monitoring points; assuming that the interval between two monitoring time points is $\Delta t$, the sampling frequency of the corresponding sensor is $1/\Delta t$, and the speed calculation of the corresponding monitoring point is expressed as follows:

$$v_j^i = (a_j^{i-1} + a_j^i) \times \Delta t/2 \qquad (1)$$

wherein $a_j^{i-1}$ represents the acceleration corresponding to the $j^{th}$ monitoring point at the $(i-1)^{th}$ time point, and $a_j^i$, represents the acceleration value corresponding to the $j^{th}$ monitoring point at the $i^{th}$ time point, wherein $j \in [1,n]$, and $v_j^i$ represents the integrated speed corresponding to the $j^{th}$ monitoring point at the $i^{th}$ time point;

after calculating the integrated speed on the edge device, judging whether the number of accelerations currently collected at the same monitoring point reaches ¼ of the sampling frequency, i.e., whether the number of acceleration sample points collected at the same monitoring point is more than ¼ of the number of sampling frequencies;

if the number of accelerations currently collected is less than ¼ of the sampling frequency value, integrating the integrated speed again to acquire a corresponding displacement on the edge device, and the displacement currently obtained is the final ideal displacement value of the cantilever beam-liked structure;

if the number of collected accelerations is more than ¼ of the sampling frequency value, dynamically de-noising the integrated speed to reduce the influence of the drift on the integrating speed; the whole de-noising process is expressed as follows:

$$Z_j^i = \alpha \cdot Z_j^{i-1} + (1-\alpha) \cdot v_j^i \qquad (2)$$

wherein $Z_j^i$ represents the trend value contained in the current integrating speed, i represent the $i^{th}$ moment, and j represents the corresponding $j^{th}$ monitoring point; $Z_j^{i-1}$ represents the drift trend value corresponding to the previous time point, and when i=2, the value of $Z_j^{i-1}$ is only the integrating speed of the previous time point, i.e., the initial point; $v_j^i$ represents the integrating speed of the $j^{th}$ monitoring point at the $i^{th}$ time point; $\alpha$ is the weight value corresponding to $Z_j^{i-1}$; if the sampling frequency of the acceleration sensor is f and the sampling interval between two adjacent time points is 1/f and the corresponding weight value is expressed as follows:

$$\alpha = \frac{1/4}{1/4 + 1/f} \qquad (3)$$

according to formula (2), the drift trend value at the current monitoring point not only depends on the trend value corresponding to the previous time point, but also depends on the speed value obtained by integration at the current time point; according to formula (3), when the value of $\alpha$ is close to 1, the drifting trend corresponding to the current time point is greatly affected by the drifting trend of the previous time point, and the current integrating speed value only gives the drifting trend of the previous time point a step size; and the de-noised speed corresponding to the current time point is expressed as follows:

$$\hat{v}_j^i = v_j^i - Z_j^i \qquad (4)$$
$$= v_j^i - \alpha \cdot Z_j^{i-1} - (1-\alpha) \cdot v_j^i$$
$$= \alpha \cdot (v_j^i - Z_j^{i-1})$$

wherein $\hat{v}_j^i$ represents a de-noised ideal speed;

obtaining corresponding displacement of the cantilever beam-liked structure, comprising integrating the de-noised ideal speed with formula (4), wherein the integration process is as follows:

$$s_j^i = (\hat{v}_j^{i-1} + \hat{v}_j^i) \times \Delta t/2 \qquad (5)$$

wherein $s_j^i$ represents the displacement corresponding to the $i^{th}$ monitoring time point, and j represents the reference sign of the monitoring point;

filtering data online with regard to real-time integration results; and a Butterworth filter is adopted, the principle of which is expressed as follows:

$$|H(w)|^2 = 1 - \frac{1}{1+\left(\frac{w}{w_c}\right)^{2m}} = 1 - \frac{1}{1+\varepsilon^2\left(\frac{w}{w_p}\right)^{2m}} \qquad (6)$$

wherein $w_c$ represents the cut-off frequency corresponding to the filter, m represents the order of the corresponding filter, and $w_p$ represents the pass-band edge frequency; when the corresponding frequency w is more than the cut-off frequency, that is $w > w_c$, the corresponding $$\left(\frac{w}{w_c}\right)^{2m}$$

value is close to infinity, and the $|H(w)|^2$ value is closer to 1, which indicates that all the signals pass, when the corresponding signal frequency is lower than the cut-off frequency, that is $w \leq w_c$, the corresponding $$\left(\frac{w}{w_c}\right)^{2m}$$

value is close to 0, and $|H(w)|^2$ is close to 0; at this moment, the corresponding signal will be cut off, which is 0; and the process is expressed as follows:

$$|H(w)|^2 = \begin{cases} 0 & w \leq w_c \\ 1 & w > w_c \end{cases} \qquad (7)$$

the larger the filter order of n is, the smoother the filtered value is, and the closer the filter is to an ideal filter; the filter order adopted is set to 8, the cut-off frequency is set to 0.012×w, and adopting a high-pass filter to de-noise the integrated displacement on the edge device, when the frequency is higher than the set cut-off frequency, the displacement obtained by integration can be regarded as the final ideal value, and when the frequency corresponding to the displacement point is lower than the cutoff frequency, the value corresponding to this part is flattened; and the de-noised integral displacement is expressed as follows:

$$\hat{s}_j^i = s_j^i - N_j^i \qquad (8)$$

wherein $s_j^i$ represents the result obtained by the corresponding direct integration in formula (5), $N_j^i$ represents the noise value obtained by high-pass filter, and $\hat{s}_j^i$ represents the corresponding ideal integral displacement value after de-noising;

embedding the corresponding ideal integral displacement value after de-noising into the edge device to describe the motion state of the cantilever beam-liked structure so as to realize dynamic fast processing of online signals.

* * * * *